(12) United States Patent
Lessway

(10) Patent No.: US 6,257,972 B1
(45) Date of Patent: Jul. 10, 2001

(54) STEADY REST HAVING LINEAR SLIDING CLAMPING BARS

(75) Inventor: Richard J. Lessway, Farmington Hills, MI (US)

(73) Assignee: Arobotech Systems, Inc., Madison Heights, MI (US)

(*) Notice: Subject to any disclaimer, the term of this patent is extended or adjusted under 35 U.S.C. 154(b) by 0 days.

(21) Appl. No.: 09/471,716

(22) Filed: Dec. 23, 1999

(51) Int. Cl.[7] .................................................. B24B 5/04

(52) U.S. Cl. .................... 451/408; 451/402; 451/407; 451/244; 82/164; 294/119.1

(58) Field of Search ........................ 451/408, 244, 451/242, 407, 49, 51, 402, 399; 82/157, 164; 294/119.1, 88; 409/165

(56) References Cited

U.S. PATENT DOCUMENTS

| 2,086,024 | * | 7/1937 | Flygare | 451/408 |
|---|---|---|---|---|
| 2,286,620 | * | 6/1942 | Hollengreen | 451/408 |
| 3,145,513 | * | 8/1964 | Porath | 451/408 |
| 4,399,639 | | 8/1983 | Lessway . | |
| 4,647,097 | | 3/1987 | Lessway . | |
| 4,647,100 | | 3/1987 | Lessway . | |
| 4,650,237 | | 3/1987 | Lessway . | |
| 5,058,468 | | 10/1991 | Lessway . | |
| 5,237,780 | | 8/1993 | Lessway . | |
| 5,285,599 | | 2/1994 | Lessway . | |

\* cited by examiner

Primary Examiner—Joseph J. Hail, III
Assistant Examiner—George Nguyen
(74) Attorney, Agent, or Firm—Charles W. Chandler

(57) ABSTRACT

This invention is related to a steady rest, which employs a pair of parallel, sliding, linear moving clamping bars for moving wear pads or rollers toward a workpiece.

12 Claims, 13 Drawing Sheets

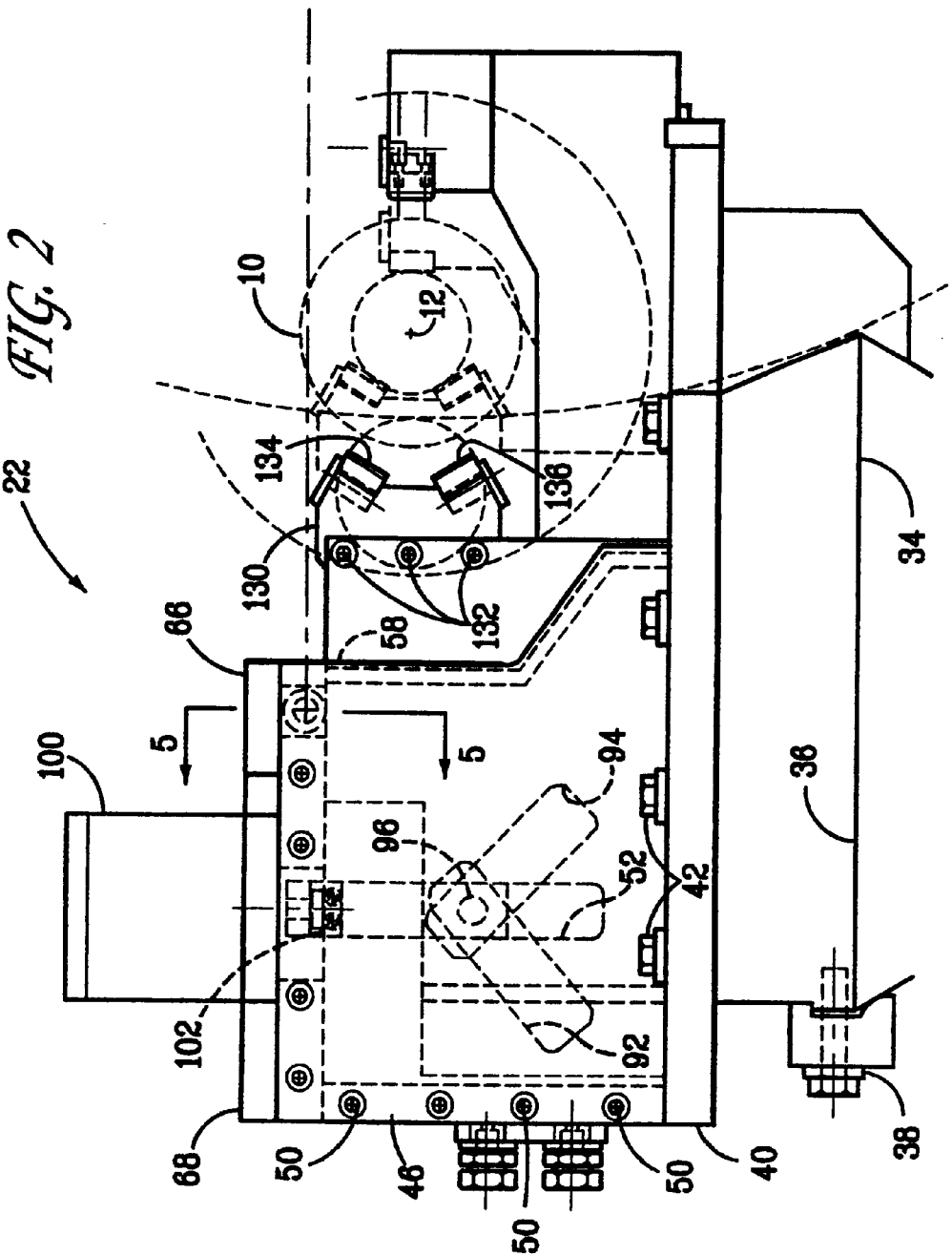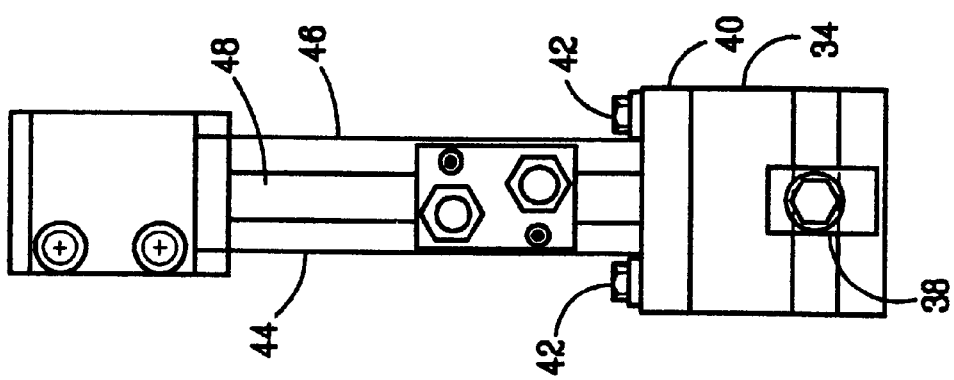

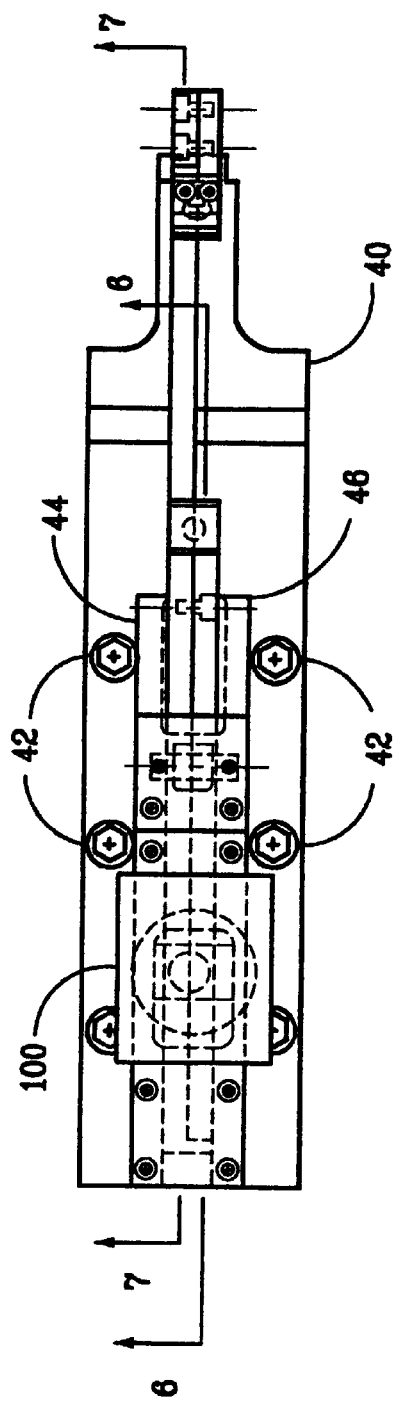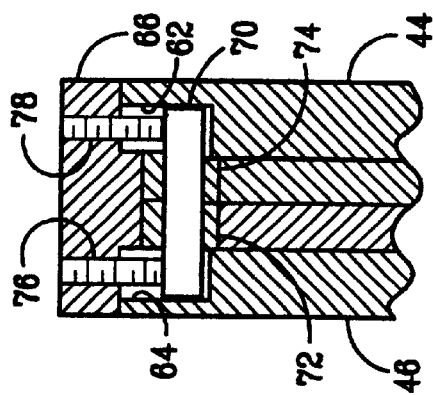

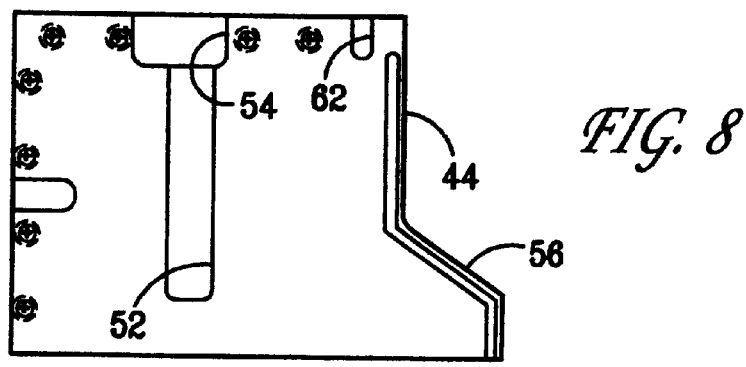
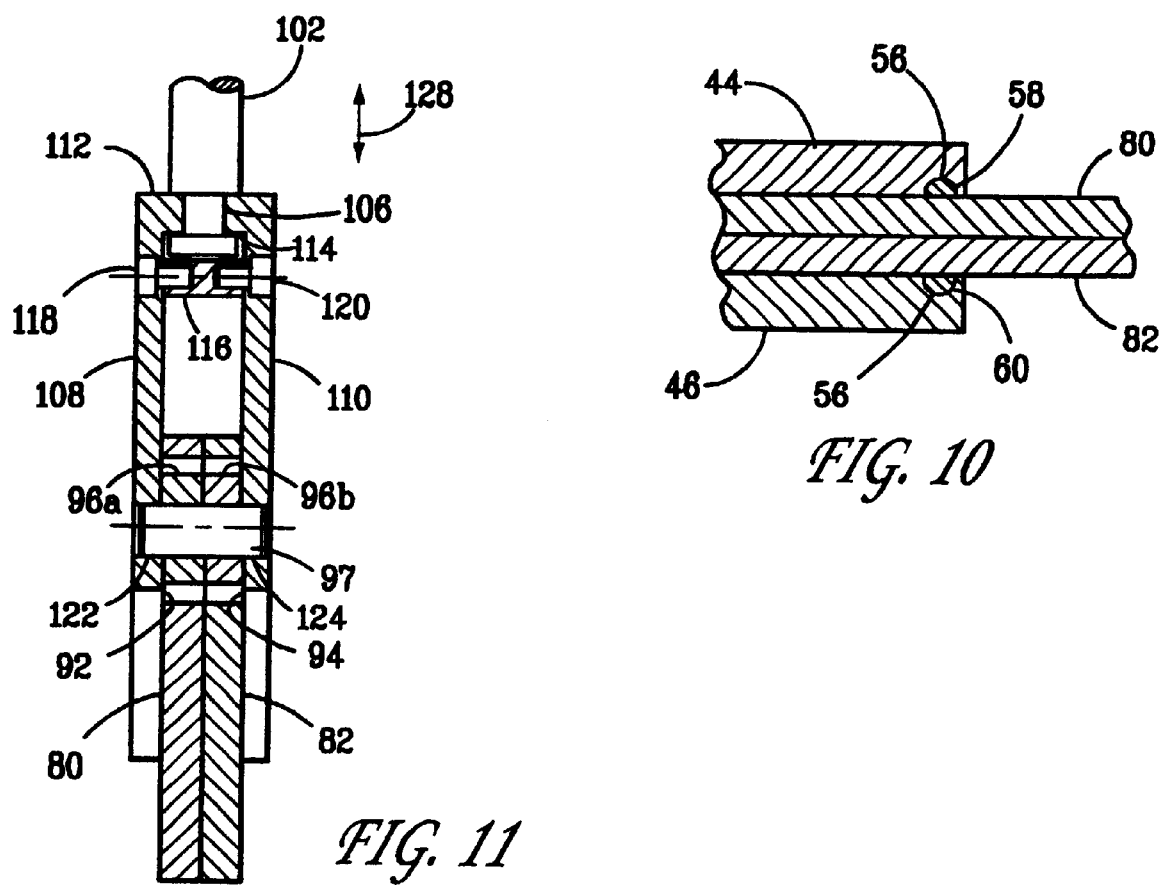

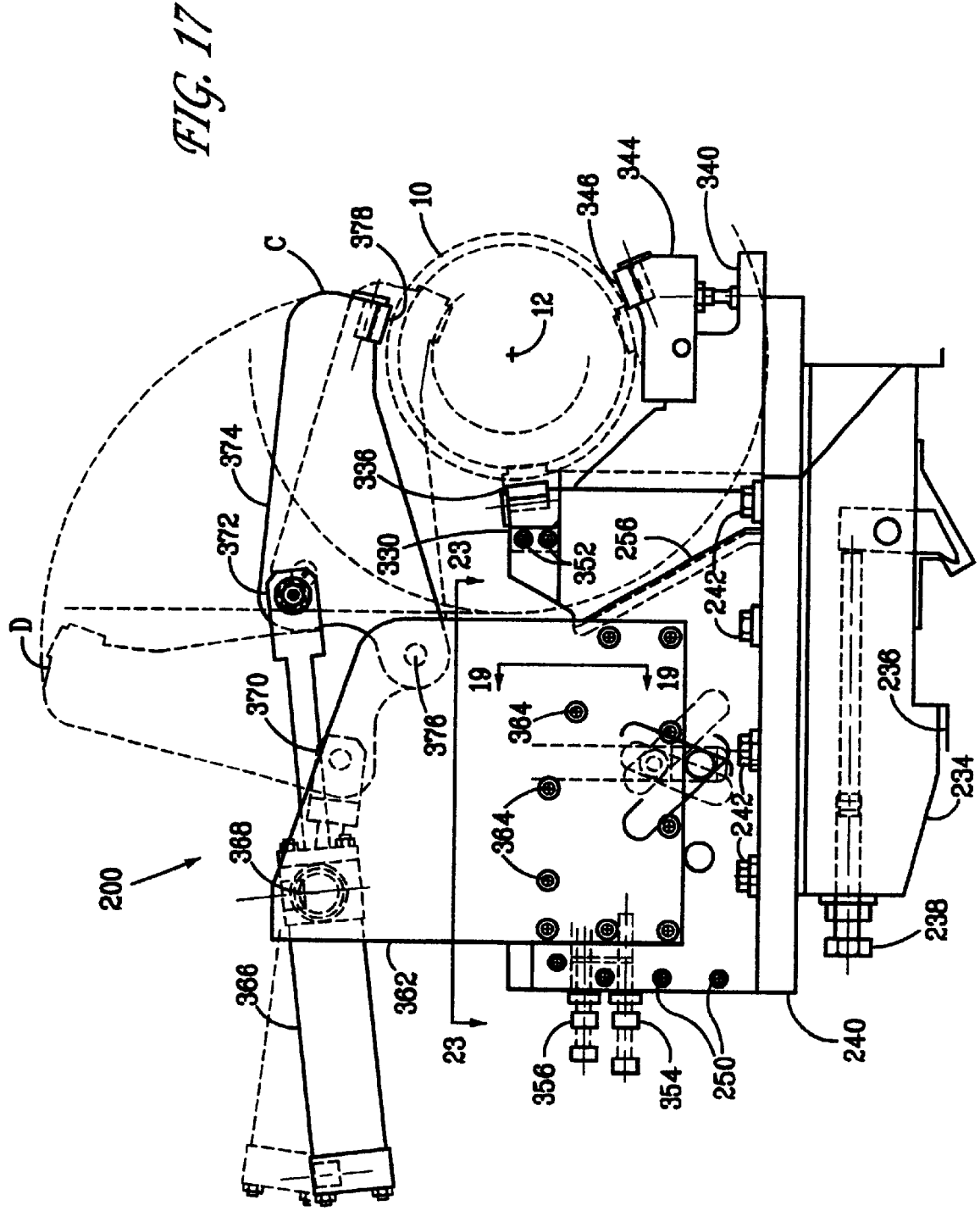

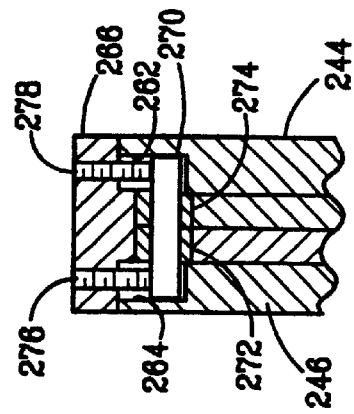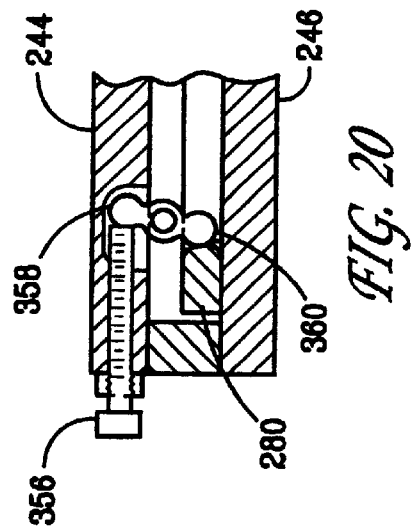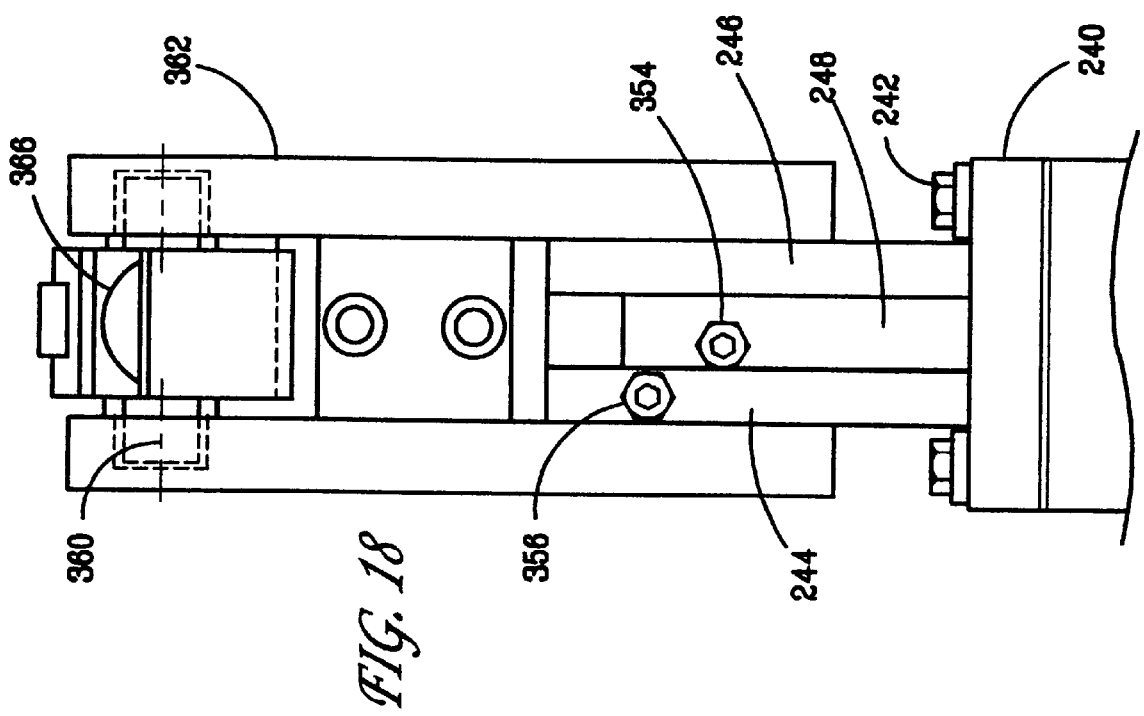

STEADY REST HAVING LINEAR SLIDING CLAMPING BARS

BACKGROUND AND SUMMARY OF THE INVENTION

This invention relates to a steady rest for supporting a rotatable cylindrical workpiece undergoing a precision machining or grinding operation. More particularly this invention relates to a steady rest in which a pair of clamping members are moved toward a workpiece by camming a pair of parallel, slidably mounted plates (bars) in opposite directions along a linear path of motion. One plate supports one clamping member; the other plate supports the other clamping member.

Steady rests are commonly used in manufacturing for supporting a rotating cylindrical workpiece during a machining or grinding operation. Examples of steady rests may be found in U.S. Pat. Nos. 4,399,639; 4,647,097; 4,647,100; 4,650,237; 5,058,468; 5,237,780; and 5,285,599 all which name Richard J. Lessway as the inventor and which have been assigned to AROBOTECH Systems, Inc. of Madison Heights, Mich.

An example in which steady rests are employed is to support a large or heavy duty crankshaft that may be 3 to 12 feet long. Such a workpiece is supported by its ends between centers or chucks but, because of its size, it requires intermediate supports, steady rests, as it is being rotated. Generally, both the crankshaft journals and the crank pin journals (pins) must be ground. New grinding technology has the crankshaft rotated about its longitudinal axis so that the crank pin orbits around the crankshaft axis of rotation. A grinding wheel then moves in to grind the orbiting crank pin. Such an application places substantial loads on the steady rests in which the direction of the resulting force vectors on the steady rest are continually changing. In some cases, the force is so substantial as to cause the clamping members to separate.

The broad purpose of the present invention is to provide a self-centering clamping device that may be used for supporting either a cylindrical workpiece that is being ground or machined as it is being rotated, or in other applications such as for cutting tubing and the like, where the center line of the workpiece must be accurately maintained.

The preferred embodiment of the invention comprises a channel-shaped housing having a pair of spaced, parallel side plates, on a slide base. Two face-to-face plate-like clamping bars are slidably mounted on the slide base between the side plates. One clamping bar is longer than the other and supports a shoe beyond the center of rotation of the workpiece. The shorter clamping bar supports another shoe on the opposite side of the workpiece. The two clamping bars are cammed in opposite directions so that as the shorter (front) clamping bar is pushed toward the workpiece, the shoe on the longer (rear) clamping bar is pulled toward the workpiece. Both clamping bars slide on the base along a linear path of motion.

Each clamping bar has a cam slot disposed at an angle to the sliding motion of the bar. A power cylinder has an actuator plunger moveable along a path perpendicular to the sliding path of the clamping bars. The plunger is connected to camming rollers disposed in both of the slots in such a manner that as the plunger is moved in one direction, the clamping bars slide to close the distance between the clamping shoes. When the plunger is moved in the opposite direction, the two clamping bars are cammed in a release direction to open the clamping shoes.

A roller is carried between the side plates and engaged with the top edges of the two bars to constrain them against vertical relative motion when a substantial vertical grinding load is applied on the clamping shoes.

The preferred steady rest can be employed in various forms. For example, in one form a single hydraulic actuator moves the two clamping bars. An electrical motor or even a hand crank can be employed for camming the two clamping bars toward and away from their clamping positions.

In another embodiment, two hydraulic actuators are employed, one for each clamping bar. This version may be used for grinding bearing journals. In still another embodiment, three actuators are employed; one for each clamping bar, and a third for a pivotal arm that swings a third clamping shoe toward the work piece.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIGS. 1–16 illustrate the preferred embodiment of the invention for grinding a crank pin.

FIG. 1 is a plan view illustrating a grinding wheel grinding a crank pin of a crankshaft supported by four steady rests illustrating the preferred embodiment of the invention;

FIG. 2 is an elevational view of one of the steady rests;

FIG. 3 is an end view as seen from the left side of FIG. 2;

FIG. 4 is a plan view of the steady rest of FIG. 2;

FIG. 5 is an enlarged sectional view as seen along lines 5—5 of FIG. 2;

FIG. 6 is a view illustrating the motion of the front clamping bar as seen along lines 6—6 of FIG. 4;

FIG. 7 is a view as seen along lines 7—7 of FIG. 4 to show the motion of the rear clamping bar;

FIG. 8 is a view of the left side plate;

FIG. 9 is a top view of the left side plate, separated from the apparatus;

FIG. 10 is a fragmentary view showing the wiper carried by the side plates for engaging the clamping bars;

FIG. 11 is an enlarged sectional view illustrating how the hydraulic plunger cams the two clamping bars in opposite directions;

FIG. 12 is a plan view of a modification of the invention employing a hand crank;

FIG. 13 is an elevational view of the modification of FIG. 12;

FIG. 14 is a view of the preferred device employing opposing dual wear pads for supporting the workpiece;

FIG. 15 is a view of a modification showing opposing dual rollers for supporting the workpiece;

FIG. 16 is a view of a modification showing three clamping rollers for supporting the workpiece.

FIGS. 17–23 show an embodiment of the invention used for main bearing grinding and which employs a single camming actuator for moving two clamping pads, and a hydraulic cylinder for moving a third clamping pad and in which FIG. 17 is an elevational view thereof;

FIG. 18 is an end view thereof;

FIG. 19 is a sectional view as seen along lines 19—19 of FIG. 17;

FIG. 20 is a sectional view as seen along lines 20—20 of FIG. 21;

FIG. 21 is a view showing the front clamping bar as seen along lines 21—21 of FIG. 23;

FIG. 22 is a view showing the rear clamping bar as seen along lines 22—22 of FIG. 23;

FIG. 23 is a view as seen along lines 23—23 of FIG. 17;

FIGS. 24–26 show another embodiment of the invention employing two camming actuators, one for each of the clamping bars and in which FIG. 24 is an elevational view thereof;

FIG. 25 is a sectional view showing a modified long clamping bar; and

FIG. 26 is a sectional view of a modified short clamping bar.

DESCRIPTION OF THE PREFERRED EMBODIMENT

FIGS. 1–21 illustrates the preferred embodiment of the invention useful for grinding a crank pin and main bearings, however, it can be employed for other applications for supporting a cylindrical workpiece.

Figure 1:
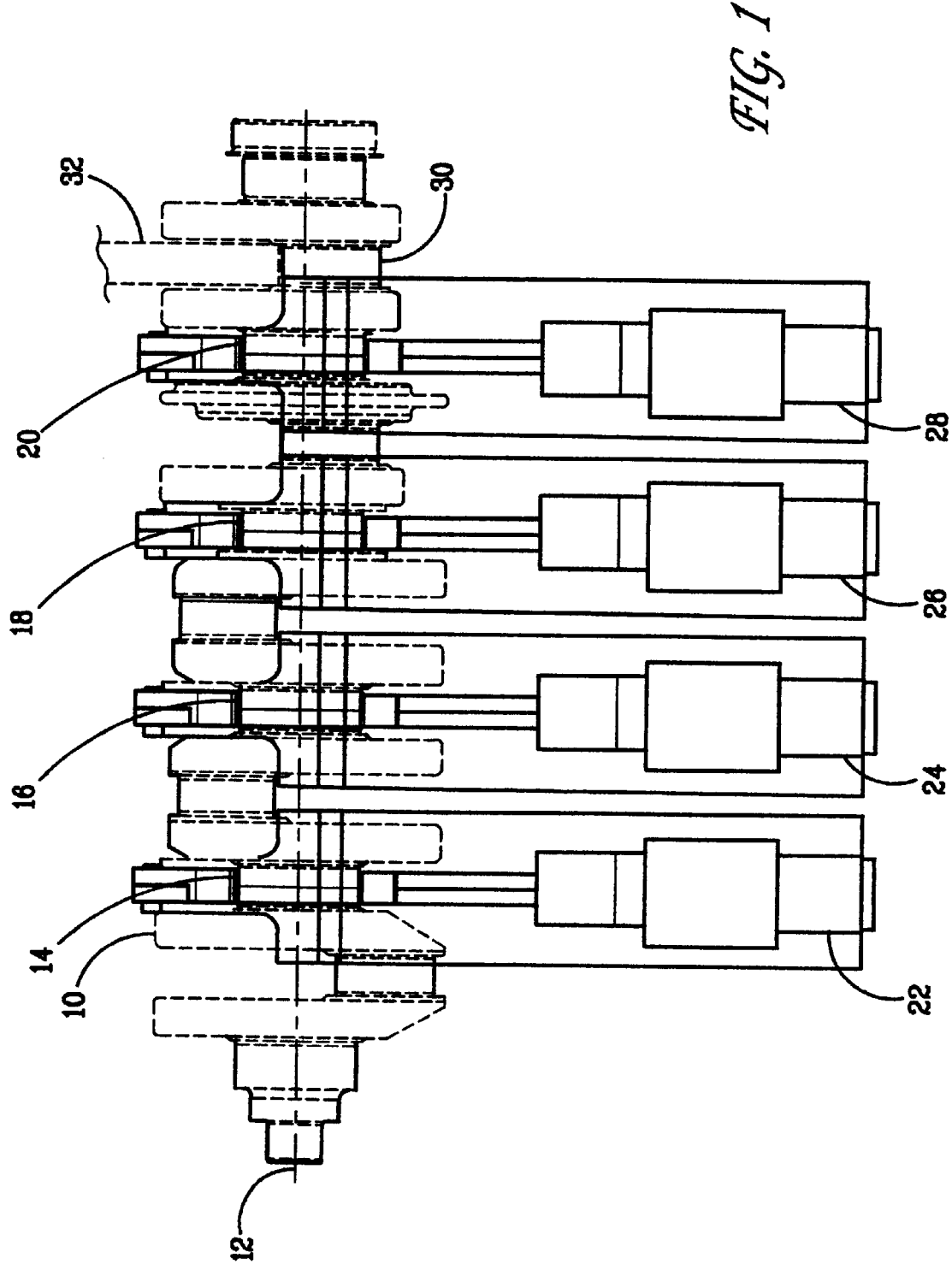

Referring to FIG. 1, a crankshaft 10 (workpiece), supported along a longitudinal axis 12, has four crankshaft journals 14, 16, 18 and 20 supported, respectively, by identical steady rests 22, 24, 26 and 28. The crankshaft is supported at its ends by means, not shown, and rotated by means well known to those skilled in the art. A rotatable grinding wheel 32 grinds a typical crank pin, illustrated at 30, as the crank pin is rotated about axis 12.

A typical preferred steady rest 22 is illustrated in FIG. 2. Steady rest 22 comprises a mounting base 34 mounted on a machine table 36 by fastener means 38. Several fasteners 42 attach an elongated slide base 40 to mounting base 34 as illustrated in FIG. 4.

Referring to FIG. 3, a left-hand side plate 44 and a right-hand side plate 46 are attached to mounting base 34 along the opposite side edges of the slide base in a spaced parallel relationship. Fasteners 50 attach end plate 48 to the rear of the two side plates as shown in FIG. 2.

FIGS. 8 and 9 illustrate the interior face of left side plate 44, the opposed face of the right side plate being a mirror image thereof. The two side plates have opposed, parallel facing interior faces. The left side plate has a vertical guide groove 52 which extends from the top edge of the side plate about ¾ of the way down toward the bottom edge. The upper end of groove 52 is enlarged at 54. Each side plate also has an elongated groove 56 adjacent its right edge for containing fiber-wiping elements 58 and 60, shown in FIG. 10.

Left side plate 44 also has a top short vertical groove 62 that, as shown in FIG. 5, is opposed to a short corresponding groove 64 in right side plate 46. Roller retainer 66 is fastened to the upper edges of the two side plates.

Top plate 68 is attached to the two side plates and cooperates with the end plate, the slide base and the two side plates to form a housing as shown in FIG. 2.

A roller pin 70 is mounted between the side plates, as illustrated in FIG. 5, with its ends in grooves 62 and 64. The roller pin supports a pair of rollers 72 and 74 for rotation around the axis of the roller pin. A pair of set screws 76 and 78 is threadably mounted in the roller retainer for adjusting the position and downward pressure of the rollers.

Figure 6:
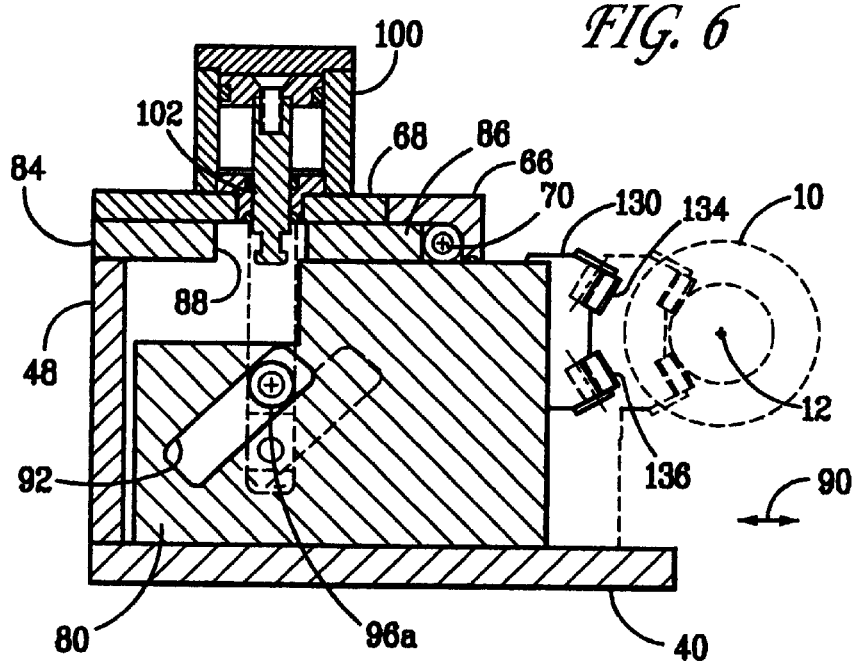
Figure 7:
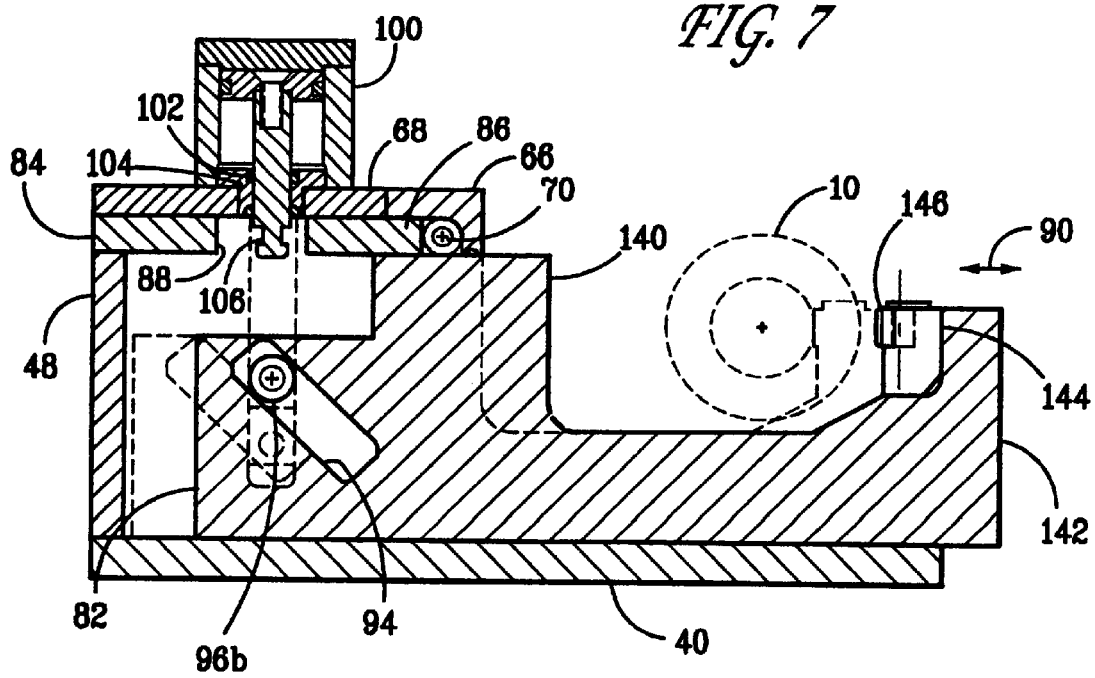

Referring to FIGS. 4, 6 and 7, a short plate-like clamping bar (plate) 80 and a long plate-like clamping bar (plate) 82 are slidably mounted on the slide base between side plates 44 and 46. The two clamping bars have substantially the same height and thickness and are slidably disposed along their lower edges on slide base 40 beneath rollers 72 and 74, rear spacer 84 and front spacer 86. The two spacers are attached to the underside of top plate 68.

Spacers 84 and 86 define an opening 88 between them on opposite sides of the vertical guide grooves in the two side plates.

The two clamping bars have their lower edges slidably moveable on slide base 40 between a clamping position, and a release position in the direction of arrows 90, as illustrated in FIGS. 6 and 7.

Short clamping bar 80 has an elongated camming slot 92 disposed at an angle of about 41° with respect to the direction of arrows 90, and extends downwardly and rearwardly from the guide grooves in the side plates. Similarly, long clamping bar 82 has a camming slot 94 that extends downwardly and forwardly from the guide grooves, preferably at an angle of about 45°.

As best illustrated in FIG. 11, a pair of cam rollers 96a and 96b are disposed in camming slots 92 and 94, respectively, and carried on axle 97.

A hydraulic actuator 100 is mounted on top plate 68 and has a plunger 102, as can be seen in FIGS. 6 and 7. The plunger extends down through an opening 104 in top plate 68 and opening 88. The plunger has an annular groove 106. Referring to FIG. 11, a left-hand pusher bar 108 and a right-hand pusher bar 110 have a pair of lips 112 and 114, respectively received in groove 106. A spacer 116 is mounted between the inner faces of the two pusher bars. A pair of threaded fasteners 118 and 120 attach spacer 116 to the two pusher bars. A pair of axle openings 122 and 124 at the lower ends of the two pusher bars support the ends of axle 97.

The arrangement is such that as actuator 100 either raises or lowers plunger 102 in the direction of arrows 128, the two pusher bars slide in vertical grooves 52 in the side plate inner faces. Cam rollers 96a and 96b thus cam the two clamping bars in opposite directions. The arrangement is best illustrated in FIG. 2. As the actuator pushes plunger 102 downwardly, the cam rollers bias the short clamping bar toward the right and the long clamping bar toward the left, toward a workpiece clamping position. When the plunger is raised, the two clamping bars are moved toward a release position in which the short clamping bar is moved toward the left, and the long clamping bar is moved toward the right.

Roller 70 is engaged at all times with the top edges of the two clamping bars to prevent them from being raised from the slide base by a grinding action on the workpiece.

Referring to FIGS. 2 and 6, a front wear pad nest 130 is attached by fastener means 132 to the short clamping bar. A pair of rockably mounted wear pads 134 and 136 are carried on the outer edge of wear pad nest 130 for engaging the workpiece.

As the short clamping bar is cammed by the actuator toward axis 12, the two wear pads move toward workpiece 10.

Referring to FIG. 7, long clamping bar 82 has a recess 140 in which workpiece 10 is supported. The long clamping bar has a shoulder 142 supporting a rear wear pad nest 144. A rockably mounted wear pad 146 is mounted on nest 144 for engaging the workpiece on the opposite side of the workpiece as wear pads 134 and 136, as the long clamping bar is moved toward the left to its clamping position.

Thus, it is to be understood that I have described a steady rest having two clamping bars, which slide in a linear motion on the slide base. The two clamping bars are biased in opposite directions by the cam rollers depending upon whether the actuator plunger is being pushed toward or raised away from the slide base. The cam rollers move in a direction generally perpendicular to the slide base, and provide a selfcentering clamping engagement by the wear pads on the workpiece.

Figure 12:
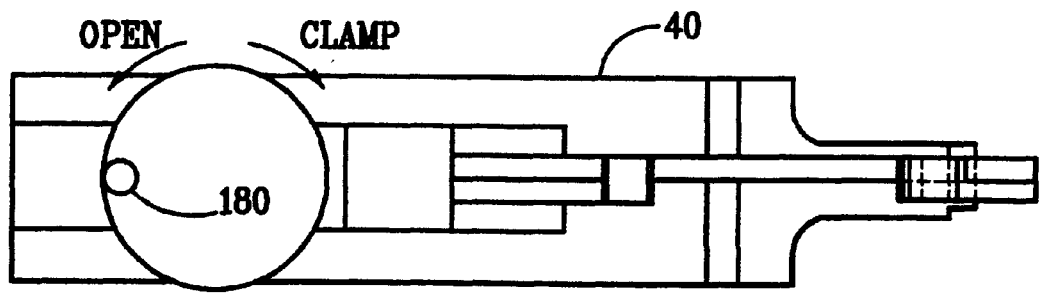
Figure 13:
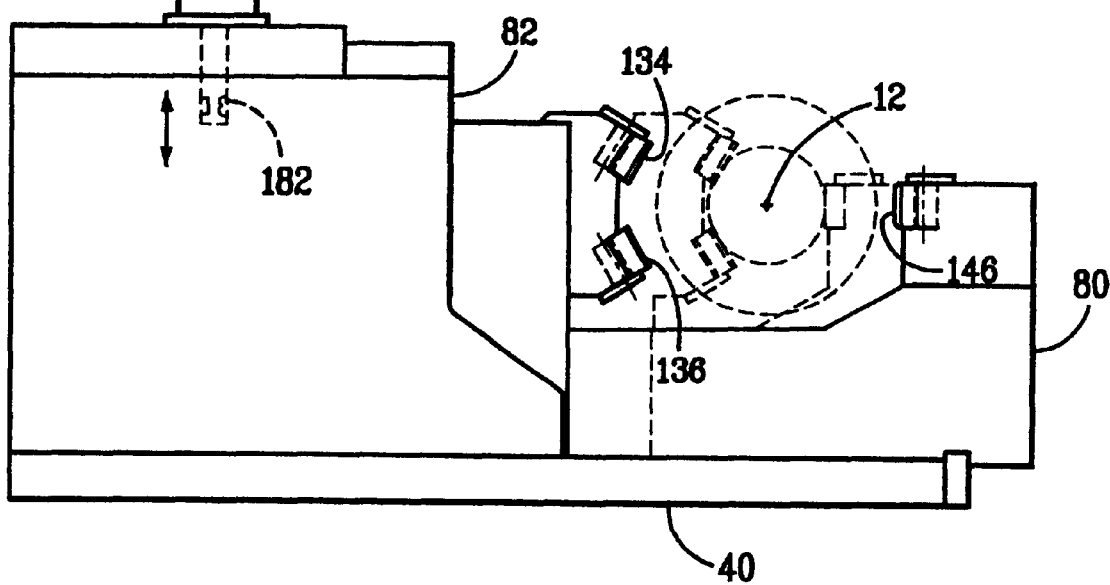

FIGS. 12 and 13 illustrate another embodiment of the invention in which hydrualic actuator 100 has been replaced by a hand wheel 180 having a vertically movable plunger 182 that corresponds to plunger 102. Plunger 182 can be raised or lowered to cam the two clamping bars either toward a release position or a clamping position.

Other forms of actuators can be used such as an electric motor, a hydraulic cylinder or the like for raising and lowering the plunger.

Figure 14:
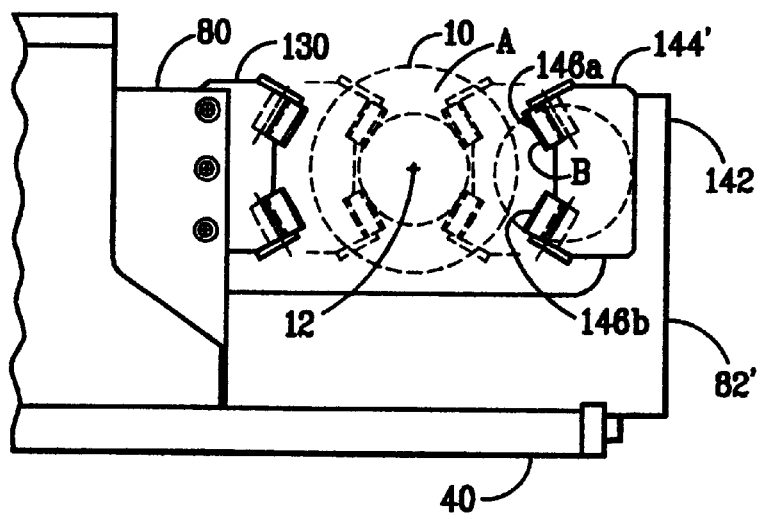
Figure 15:
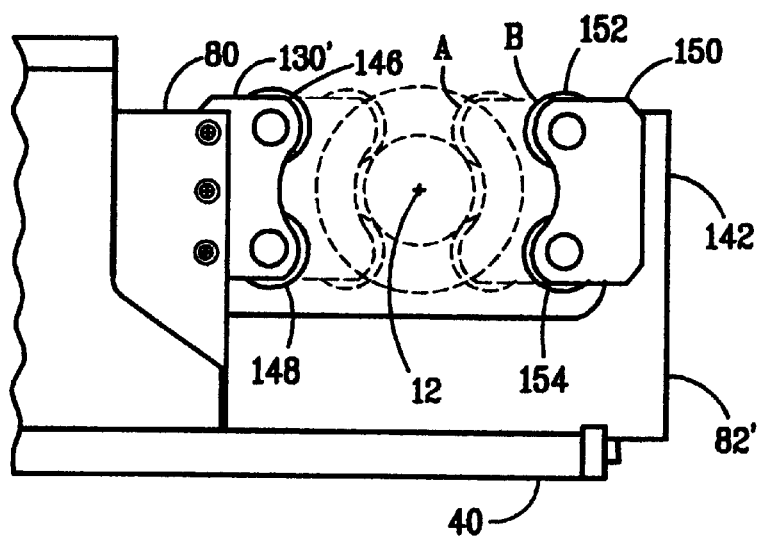
Figure 16:
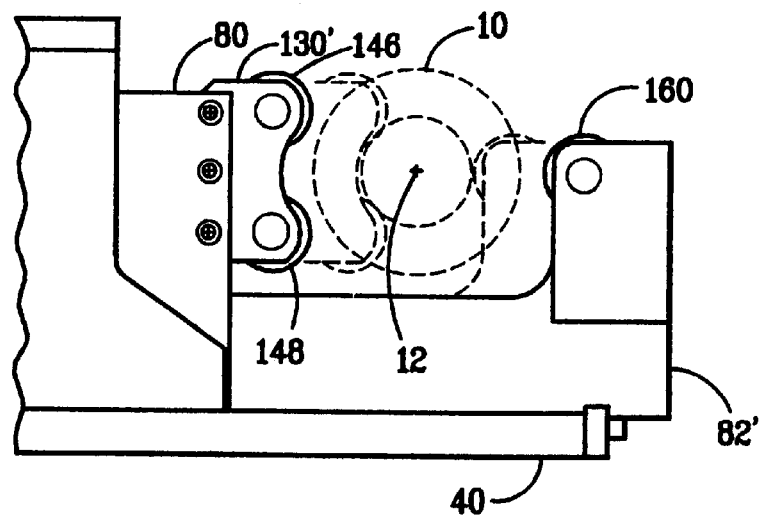

FIGS. 14–16 show various clamping pad or roller arrangements that can be employed. For example, in FIG. 14, rear wear pad nest 144 has been replaced by a nest 144' adapted to support a pair of wear pads 146 and 148. Thus, two wear pads are supported on opposite sides of workpiece 10.

In FIG. 15, front wear pad nest 130 has been replaced by wear pad nest 130' that supports a pair of wear rollers 146 and 148. Similarly, a rear wear pad nest 150 is mounted on the rear clamping bar and supports a pair of wear rollers 152 and 154. Thus two wear rollers are supported on each of the clamping bars on opposite sides of the workpiece, and can be moved toward a clamping position illustrated at "A" or a release position illustrated at "B".

FIG. 16 illustrates still another embodiment of the invention in which wear nest 130' is mounted on the short clamping bar, and supports spaced clamping rollers 146 and 148. The rear wear bar supports a rear clamping roller 160 so that the workpiece 10 is engaged by three rollers 146, 148 and 160 spaced around the axis 12 of the workpiece.

FIGS. 17–23 illustrate another embodiment of the invention in the form of a steady rest 200, which may be used for either grinding a bearing journal or a crank pin.

Figure 23:
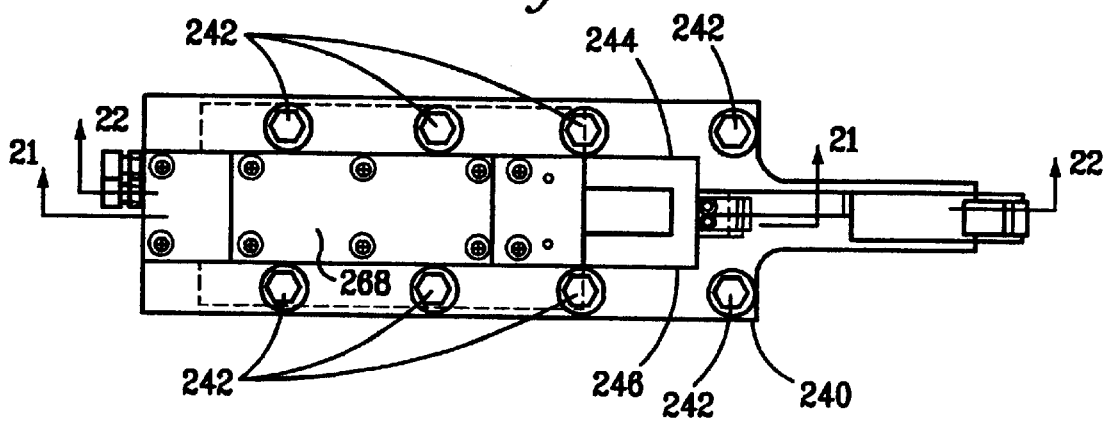

Steady rest 200 comprises a mounting base 234 mounted on a suitable table 236 by adjustable fastener means 238 which adjusts the position of base 234. An elongated slide base 240 is attached by several fasteners 242 to mounting base 234, as illustrated in FIG. 23. A left-hand side plate 244 and a right-hand side plate 246 are attached to slide base 240 in a spaced, parallel relationship.

The opposed faces of the left-hand and right-hand side plates are essentially identical to the faces of the side plates of the embodiment of FIG. 2. The left-hand side plate has a vertical guide groove 252 which extends from the top edge of the side plate about three-quarters of the way down toward the bottom edge. The two side plates each have opposed parallel elongated grooves 256, best shown in FIG. 17, for containing fiber wiping elements as shown in the embodiment of FIG. 2.

Referring to FIG. 19, left-hand side plate 244 also has a top short vertical groove 262, which is opposed to a short groove 264 in right-hand side plate 246. A roll retainer 266 is fastened to the upper edges of the two side plates.

Top plate 268 is attached to the upper edges of the two side plates and cooperates with the end plate, the slide base, and the two side plates to form a housing. A roller pin 270 is mounted between the side plates as illustrated in FIG. 19, with its ends in grooves 262 and 264. The roller pin supports a pair of rollers 272 and 274 for rotation about the axis of the roller pin. The position and downward pressure of the roller pin is adjusted by a pair of set screws 276 and 278 which are threadably mounted in the roller retainer.

Figure 21:
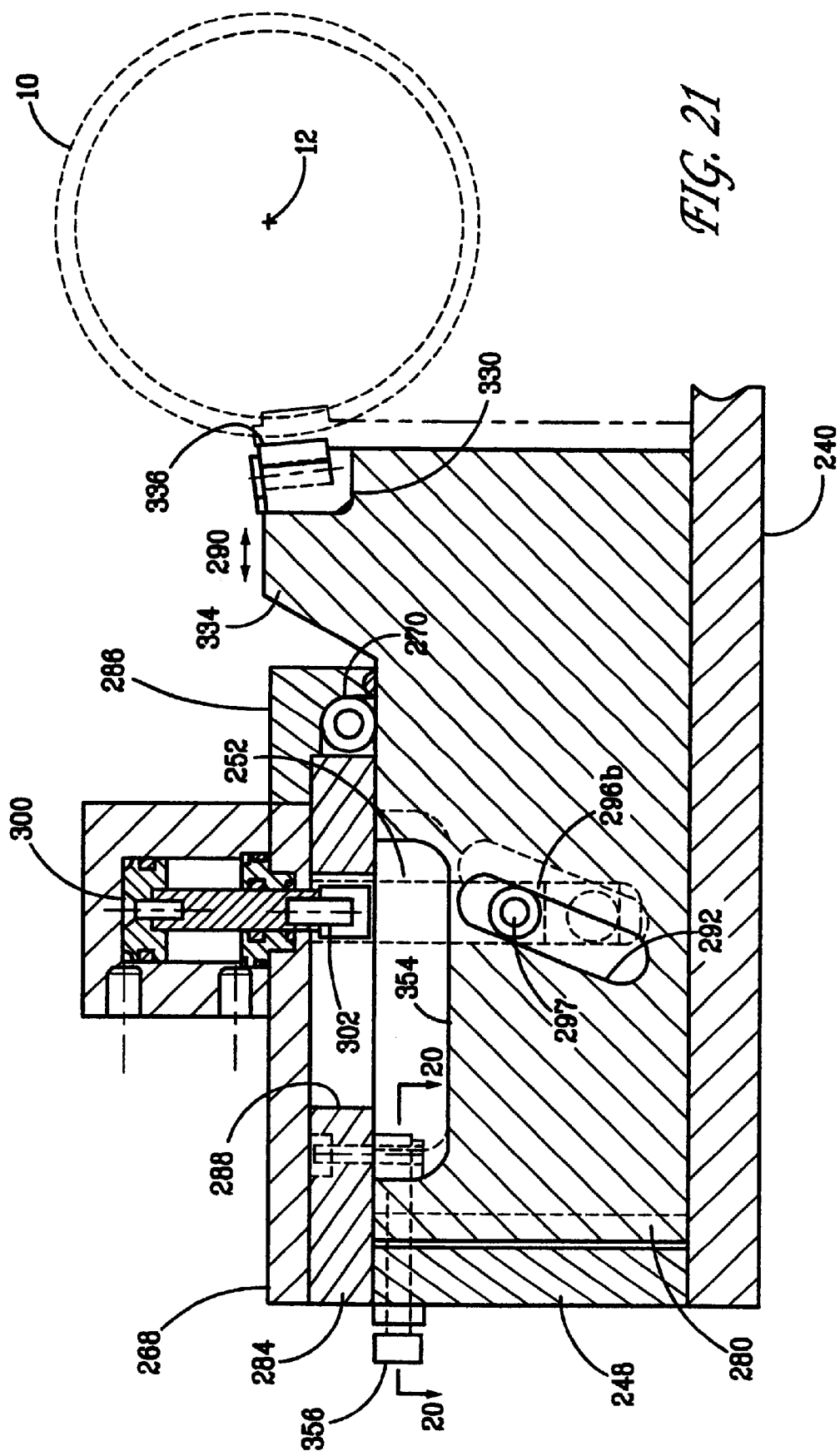
Figure 22:
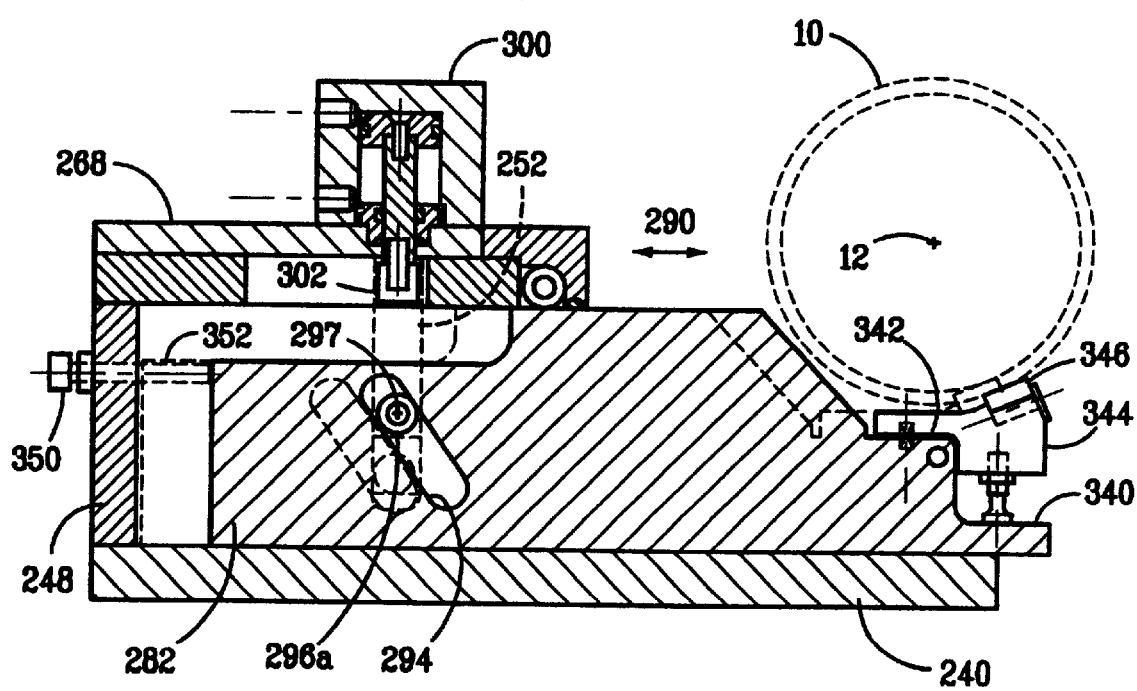

Referring to FIGS. 17, 21 and 22 a short plate-like, clamping bar 280 and a long plate-like clamping bar 282 are slidably mounted on slide base 240 between side plates 244 and 246. The two clamping bars have substantially the same thickness and are slidably disposed along their lower edges on the slide base beneath rollers 272 and 274, a rear spacer 284 and a front spacer 286. Spacers 284 and 286 define an opening 288 between them adjacent the vertical guide grooves in the two side plates.

The two clamping bars are slidably moveable on the slide base along a linear path of motion between a clamping position and a release position in the direction of arrow 290 as illustrated in FIGS. 21 and 22.

Short clamping bar 280 has an elongated camming slot 292 disposed at a predetermined angle with respect to the direction of arrow 290, and extends downwardly and rearwardly from the guide grooves in the side plates. Similarly, long clamping bar 282 has a camming slot 294 that extends downwardly and forwardly from the guide grooves, preferably at a pre-determined angle.

The two spacers 284 and 286 are attached to the underside of top plate 268. A pair of camming rollers 296a and 296b is disposed in camming slots 292 and 294, respectively, and is carried on axle 297.

A hydraulic actuator 300 is mounted on top plate 268 and has a plunger 302 as best shown in FIGS. 21 and 22.

A pair of pusher bars, not shown, is connected between plunger 302 and axle 297 in the same manner as illustrated with respect to pusher bars 108 and 110 as illustrated in FIG. 11. The arrangement is such that as actuator 300 either raises or lowers plunger 302, the pusher bars slide in the vertical guide grooves in the side plates. Cam rollers 296a and 296b cam the two clamping bars in opposite directions. As the actuator pushes plunger 302 downwardly, the cam rollers bias the short clamping bar to the right and the long clamping bar to the left, as viewed in FIGS. 21 and 22, toward the workpiece. When the plunger is raised, the two clamping bars are moved toward a release position in which the short clamping bar is moved toward the left and the long clamping bar is moved toward the right. Roller 270 continuously engages the top edges of the two clamping bars to prevent them from being raised from the slide base by a grinding action on the workpiece.

Referring to FIG. 17, a front wear pad nest 330 is attached by fastener means 332 to a raised shoulder 334 of the short clamping bar. A rockably mounted wear pad 336 is carried on the upper corner of the wear nest for engaging a workpiece 10.

Referring to FIG. 22, the long clamping bar differs from the clamping bar illustrated in the embodiment of FIG. 2 in that the extreme right end of the bar, has a lower step 340 and an upper step 342. An adjustable wear pad nest 344 is mounted on steps 340 and 342 to support a rockably mounted wear pad 346 in a lower position than wear pad 336 for engaging the workpiece.

Referring to FIG. 22, a locating screw 350 is mounted in back plate 248 and has one end 352 engaging the left edge of the long clamping bar in its release position. Similarly, referring to FIG. 21, the short clamping bar has an elongated notch 354 along its upper edge generally aligned with a second locating screw 356.

Referring to FIG. 20, locating screw 356 is mounted in left side plate 244 so that its inner end engages one end of a pivotally mounted stop 358. The other end 360 of the pivotally mounted stop engages the inside of notch 354 along short clamping bar 280.

Referring to FIGS. 17 and 18, a left-hand clamp mounting plate 360 is attached to left side plate 244. A right-hand mounting plate 362 is attached to right side plate 246 by fastener means 364. The two mounting plates are parallel to one another and extend above actuator 300. A cylinder actuator means 366 is pivotally mounted by pivot means 368 between the two mounting plates.

The actuator has a piston rod 370 connected by a clevis 372 to a top clamping plate 374. Top clamping plate 374 is connected by pivot means 376 to the two side mounting plates so as to be pivotable between a lower clamping position illustrated at "C", and an upper release position illustrated at "D". Top clamping plate 374 carries a third wear pad shoe 378 for engaging an upper portion of the workpiece.

The arrangement is such that workpiece 10 can be supported by three wear pads located about 120° apart.

Figure 24:
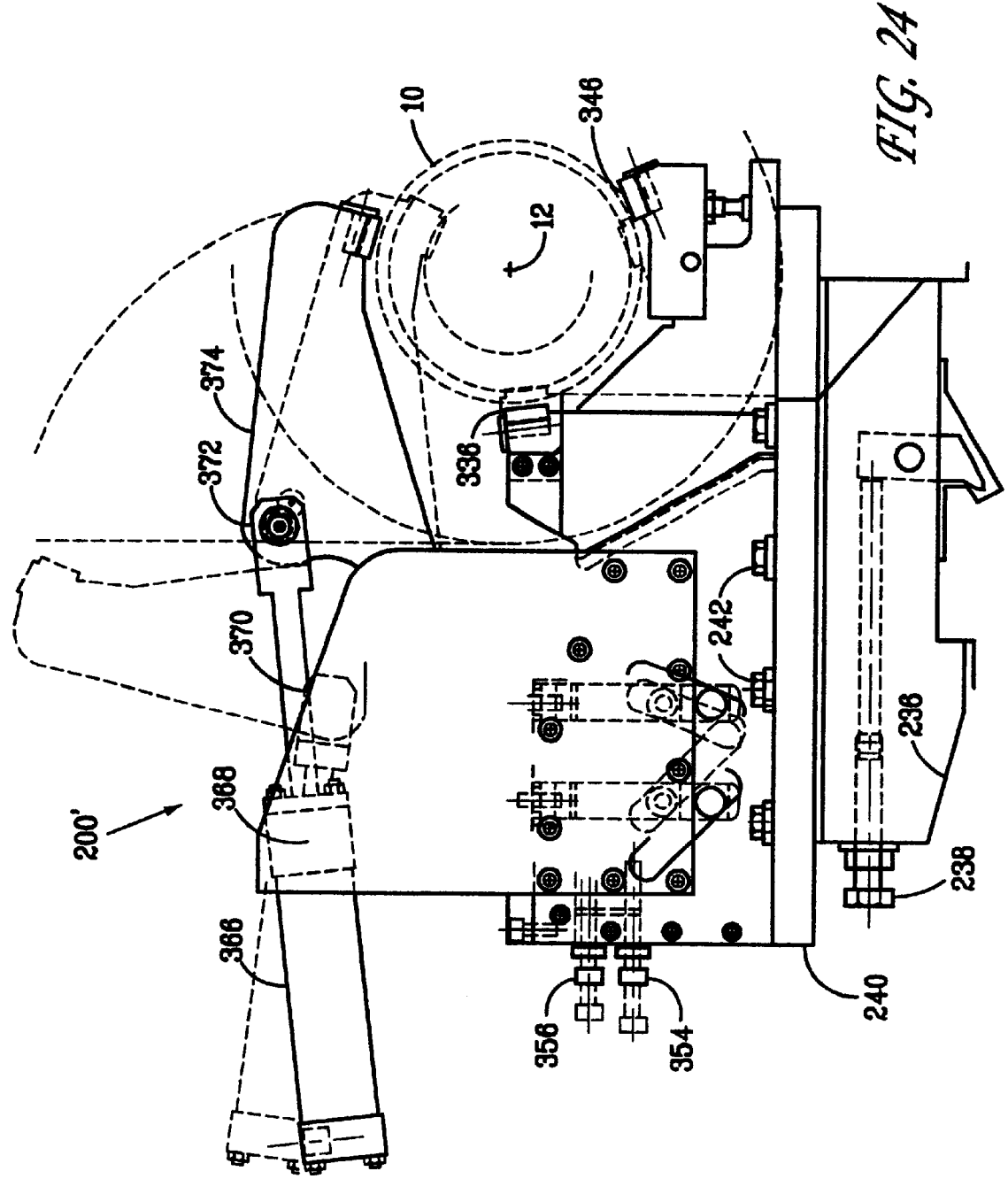

FIG. 24 illustrates another embodiment of the invention 200' in which corresponding numbered parts are identical to steady rest 200. The primary difference is that individual actuators move the two clamping bars.

Figure 25:
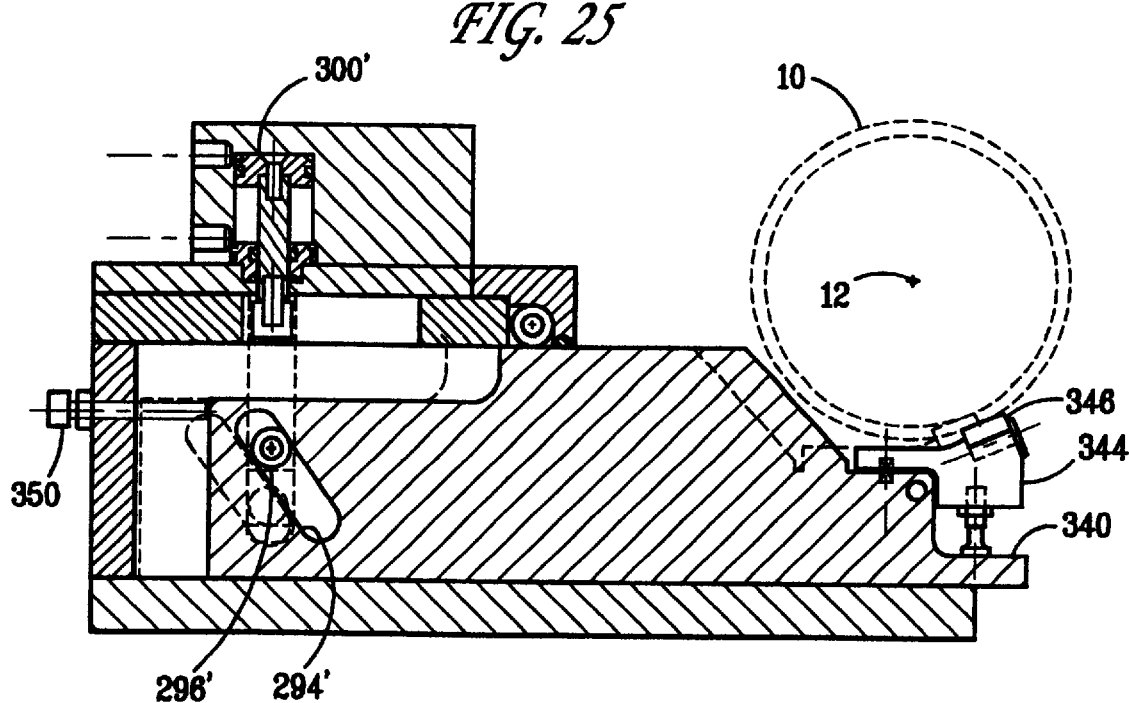
Figure 26:
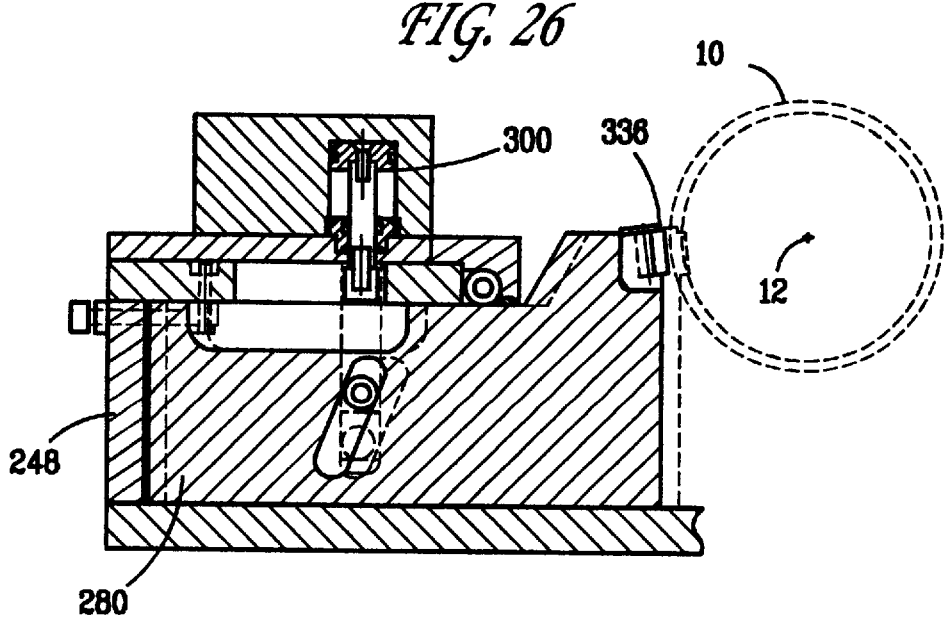

Note that in FIG. 26, short slide bar 280 is identical to that illustrated in the embodiment of FIG. 17. However, referring to FIG. 25, the long slide bar has a camming slot 294' located toward the left so that a separate actuator 300', operatively connected to a cam roller 296', can independently move the long clamping bar. Two actuators provide more power at different regulated speeds in moving the two clamping bars and for supporting the workpiece.

Thus it is to be understood that I have described an improved work supporting device in which two work holding pads or rollers support the workpiece, each pad being mounted on a slidable plate supported along its edge, one plate being cammed in one direction and the other plate being cammed in the opposite direction along a linear path of motion by a suitable actuator. Both clamping bars are moved simultaneously or at a controlled regulated rate, but in opposite directions.

Having described my invention, I claim:

1. In a workpiece gripping apparatus, a combination comprising:

a slide base;

a first clamping bar slidably mounted on the slide base along a first linear path of motion between a clamping position, and a release position;

a second clamping bar slidably mounted on the slide base adjacent the first clamping bar along a second linear path of motion parallel to the first path of motion of the first clamping bar between a clamping position, and a release position;

the first clamping bar having a camming slot disposed at an acute angle with respect to the linear path of motion of the first clamping bar;

the second clamping bar having a camming slot disposed at an acute angle with respect to the linear path of motion of the second clamping bar;

actuator means and means supporting the actuator means for movement generally normal to the slide base;

a camming means disposed in the camming slots of the first clamping bar and the second clamping bar for moving them in opposite directions along their respective linear paths of motion toward their respective clamping positions as the camming means is moved in an actuating motion, and for moving the clamping bars toward their respective release positions as the camming means is moved in a reverse motion;

means connecting the actuator means to the camming means for moving same to cam the clamping bars toward their clamping positions to engage a workpiece; and a first workpiece gripping member on the first clamping bar and a second workpiece gripping member on the second clamping bar for engaging a rotatable workpiece as the clamping bars are urged toward their respective clamping positions.

2. In a workpiece gripping apparatus as defined in claim 1, in which the workpiece gripping members each comprise a wear pad.

3. In a workpiece gripping apparatus as defined in claim 1, in which the workpiece gripping members each comprise a roller.

4. In a workpiece gripping apparatus as defined in claim 1, in which the first workpiece gripping member is spaced from the second workpiece gripping member, and the first and second workpiece gripping members are disposed on opposite sides of the axis of rotation of the workpiece.

5. In a workpiece gripping apparatus as defined in claim 1, including a third clamping member, and means supporting the third clamping member for movement toward and away from the workpiece for gripping the workpiece in a location spaced from the clamping positions of the first and second workpiece gripping members.

6. In a workpiece gripping apparatus as defined in claim 5, including a piston and cylinder actuator for moving the third clamping member toward and away from the workpiece.

7. In a workpiece gripping apparatus as defined in claim 1, in which the actuator means comprises a first actuator connected to a camming member in the camming slot of the first clamping bar, and a second actuator connected to a camming member disposed in the camming slot of the second clamping bar for moving the two clamping bars toward and away from their respective clamping and release positions.

8. In a workpiece gripping apparatus as defined in claim 1, in which the actuator means comprises a hydraulic actuator.

9. In a gripping apparatus as defined in claim 1, in which the actuator means comprises a hand wheel operatively connected to the camming means for moving the clamping bars toward their respective clamping and release positions.

10. In a workpiece gripping apparatus, a combination comprising:

a slide base;

a pair of spaced parallel side plates attached to the slide base, and a top plate mounted on the pair of side plates to form a housing;

a first clamping bar disposed between said side plates and slidably mounted on the slide base along a first linear path of motion between a clamping position and a release position;

a second clamping bar disposed between said side plates and slidably mounted on the slide base adjacent the first clamping bar along a second linear path of motion parallel to the first path of motion of the first clamping bar between a clamping position and a release position;

a roller means mounted on the side plates above the short and the long clamping bars and rollably engaged therewith, and means for biasing the roller means toward the long and the short clamping bars to prevent separation thereof from the slide base;

the first clamping bar having a camming slot disposed at an acute angle with respect to the linear path of motion of the first clamping bar;

the second clamping bar having a camming slot disposed at an acute angle with respect to the linear path of motion of the second clamping bar;

an actuator member, and means mounting the actuator member on the housing for movement toward the slide base;

a camming means disposed in the camming slots of the first clamping bar and the second clamping bar for moving them toward their respective clamping positions as the camming means is moved in a first direction, and for moving the clamping bars toward their respective release positions as the camming means is moved in a reverse direction;

means connecting the actuator means to the camming means for moving same in said first and second directions to move the clamping bars toward their respective clamping and release positions to either engage or to release the workpiece; and a first workpiece engaging member on the first clamping bar and a second workpiece engaging member on the second clamping bar for engaging the workpiece as the clamping bars are urged toward their respective clamping positions.

11. In a workpiece gripping apparatus as defined in claim 10, a locating screw, and structure supporting the locating screw in the path of motion of at least one of said clamping bars, and means for adjusting the locating screw to abut said at least one of the clamping bars to define an extreme position thereof on the slide base.

12. In a workpiece gripping apparatus as defined in claim 10, a locating screw and structure supporting same in a position off set from the path of motion of at least one of said clamping bars; and an elongated pivotally supported stop (360) having one end abutting the locating screw, and an opposite end abutting said at least one of said clamping bars to define an extreme position thereof on the slide base.

* * * * *